(12) United States Patent
Tamura et al.

(10) Patent No.: US 10,444,547 B2
(45) Date of Patent: Oct. 15, 2019

(54) FUNCTIONAL LAMINATED SPECTACLE LENS HAVING FUNCTIONAL LAYER FORMED BY SPIN-COATING

(71) Applicant: TALEX OPTICAL CO., LTD., Osaka (JP)

(72) Inventors: Hiroo Tamura, Osaka (JP); Shoichi Mitsuuchi, Osaka (JP); Kenzo Wada, Osaka (JP); Ryogo Nitta, Osaka (JP)

(73) Assignee: TALEX OPTICAL CO., LTD., Osaka (JP)

( * ) Notice: Subject to any disclaimer, the term of this patent is extended or adjusted under 35 U.S.C. 154(b) by 0 days.

(21) Appl. No.: 15/323,837

(22) PCT Filed: Jun. 26, 2015

(86) PCT No.: PCT/JP2015/068494
§ 371 (c)(1),
(2) Date: Jan. 4, 2017

(87) PCT Pub. No.: WO2016/006478
PCT Pub. Date: Jan. 14, 2016

(65) Prior Publication Data
US 2017/0153464 A1    Jun. 1, 2017

(30) Foreign Application Priority Data
Jul. 7, 2014   (JP) ................. 2014-139546

(51) Int. Cl.
*G02C 7/10*     (2006.01)
*C09D 7/40*     (2018.01)
(Continued)

(52) U.S. Cl.
CPC ............. *G02C 7/108* (2013.01); *B05D 1/005* (2013.01); *B29D 11/00884* (2013.01);
(Continued)

(58) Field of Classification Search
CPC .......... G02C 7/108; G02C 7/41; G02C 7/102; G02C 7/12; G02C 2202/16; C09D 7/007;
(Continued)

(56) References Cited

U.S. PATENT DOCUMENTS

| | | |
|---|---|---|
| 6,080,816 A | 6/2000 | Gregorovich et al. |
| 2004/0142185 A1 | 7/2004 | Takushima |

(Continued)

FOREIGN PATENT DOCUMENTS

| | | |
|---|---|---|
| JP | 2001-522925 | 11/2001 |
| JP | 2004-170962 | 6/2004 |

(Continued)

OTHER PUBLICATIONS

Extended European Search Report dated Jun. 1, 2017 in corresponding European patent application No. 15819273.2.

(Continued)

*Primary Examiner* — Collin X Beatty
(74) *Attorney, Agent, or Firm* — Wenderoth, Lind & Ponack, L.L.P.

(57) ABSTRACT

A functional laminated spectacle lens is provided which includes, as constituent layers, an outer lens, a polarizing film, and an inner lens. A functional layer is formed on at least one of the constituent layers. Another constituent layer is laminated on and joined to the functional layer through an adhesive layer. The functional layer is formed using a spin coating material which is obtained by incorporating a functional pigment into an acrylic urethane resin containing, as a main component, an acrylic polyol containing 4-hydroxybutyl acrylate, and, as a curable component, a polyisocyanate. Once the spin coating material cures, the required functional pigment is reliably maintained in the functional layer by a three-dimensional network structure, the migration of the functional pigment into an adjacent resin mono- (Continued)

mer-containing layer is prevented, and the functional pigment is made less susceptible to the effect of an organic peroxide contained in the resin.

6 Claims, 3 Drawing Sheets

(51) Int. Cl.

| | | |
|---|---|---|
| C09D 175/04 | (2006.01) | |
| G02B 5/22 | (2006.01) | |
| G02B 5/23 | (2006.01) | |
| G02C 7/12 | (2006.01) | |
| C09D 7/41 | (2018.01) | |
| B05D 1/00 | (2006.01) | |
| B32B 27/36 | (2006.01) | |
| B29D 11/00 | (2006.01) | |

(52) U.S. Cl.
CPC .............. *B32B 27/365* (2013.01); *C09D 7/40* (2018.01); *C09D 7/41* (2018.01); *C09D 175/04* (2013.01); *G02B 5/22* (2013.01); *G02B 5/23* (2013.01); *G02C 7/102* (2013.01); *G02C 7/12* (2013.01); *B29D 11/00644* (2013.01); *B29D 11/00653* (2013.01); *B32B 2255/26* (2013.01); *B32B 2307/42* (2013.01); *B32B 2551/00* (2013.01); *G02C 2202/16* (2013.01)

(58) Field of Classification Search
CPC . C09D 175/04; B32B 27/365; B32B 2307/42; B32B 2255/26; B32B 2551/00; B05D 1/005
USPC .......................................... 351/159.6–159.66
See application file for complete search history.

(56) References Cited

U.S. PATENT DOCUMENTS

| | | | |
|---|---|---|---|
| 2005/0269721 A1 | 12/2005 | Adileh et al. | |
| 2009/0323179 A1* | 12/2009 | Kawai | B32B 27/28 351/159.62 |
| 2012/0225241 A1 | 9/2012 | Kashima et al. | |
| 2012/0287395 A1 | 11/2012 | Tamura et al. | |
| 2013/0059068 A1 | 3/2013 | Yajima | |
| 2014/0043586 A1* | 2/2014 | Hiraren | C09K 9/02 351/159.61 |
| 2014/0146285 A1* | 5/2014 | Otani | C08F 2/44 351/159.61 |
| 2015/0293287 A1 | 10/2015 | Yasui et al. | |
| 2016/0017218 A1* | 1/2016 | Kojima | C09K 11/06 359/355 |

FOREIGN PATENT DOCUMENTS

| | | |
|---|---|---|
| JP | 2004-323794 | 11/2004 |
| JP | 2008-501989 | 1/2008 |
| JP | 2008-134618 | 6/2008 |
| JP | 2012-35614 | 2/2012 |
| JP | 2013-11874 | 1/2013 |
| JP | 2013-54096 | 3/2013 |
| JP | 2013-109257 | 6/2013 |
| WO | 2011/049186 | 4/2011 |
| WO | 2011/105211 | 9/2011 |
| WO | 2014/034630 | 3/2014 |

OTHER PUBLICATIONS

International Preliminary Report on Patentability and Written Opinion of the International Searching Authority dated Jan. 10, 2017 in International (PCT) Application No. PCT/JP2015/068494.

* cited by examiner

FUNCTIONAL LAMINATED SPECTACLE LENS HAVING FUNCTIONAL LAYER FORMED BY SPIN-COATING

TECHNICAL FIELD

The present invention relates to a spin coating material for use in a functional laminated spectacle lens, a functional laminated spectacle lens including the functional spin-coated layer, and a method of producing the same.

BACKGROUND ART

For the purpose of obtaining sunglass lenses and polarized spectacle lenses having high contrast properties, in general, it is known to use a resin lens having anti-glare and high contrast properties, which is made of a polyurethane resin or an allyl diglycol carbonate resin into which an organic light-absorbing pigment capable of absorbing light having a wavelength within the range of from 560 to 610 nm, such as tetraazaporphyrin, is uniformly incorporated (see, the below-identified Patent Document 1, for example).

In the resin lens as described above, the functional organic light-absorbing pigment is dispersed and retained uniformly throughout the entire lens. Therefore, when the thickness of the lens is adjusted by machining and polishing in order to adjust the power of the lens, the function of the lens is altered depending on the adjusted thickness of the lens, resulting in a failure to provide a uniform effect throughout the entire lens. Further, since a portion of the functional pigment is removed due to the machine processing of the lens, it has been unable to effectively and efficiently utilize the functional pigment.

In the case of a flat lens which does not require machine processing, the pigments used in the production thereof will not be wasted, even when a plurality of types of functional pigments are used in combination. In the case of a semi-lens (also referred to as a semi-finished lens) in which the adjustment of the lens power by machining is intended, on the other hand, the proportion of the functional pigments mixed in the resin lens to be wasted as machining chips is increased, leading to a problem of low utilization efficiency of valuable pigments.

In order to address the above mentioned problems, the use of a means to form one layer of functional film on the surface of a lens is also known.

For example, it is known to form a coating film by spin coating, when forming a functional film such as a hard coat or a polarizing film by applying a coating liquid on a lens substrate, in order to prevent the occurrence of an interference fringe due to uneven film thickness of the functional film (see the below-identified Patent Document 2).

Further, it is also known to form a coating film containing a photochromic pigment on the surface of a lens by a spin coating method (see the below-identified Patent Document 3).

PRIOR ART DOCUMENTS

Patent Documents

Patent Document 1: JP 2013-109257 A
Patent Document 2: JP 2013-11874 A
Patent Document 3: JP 2013-54096 A

SUMMARY OF THE INVENTION

Problems to be Solved by the Invention

In cases where a spin coating method is used in order to impart high contrast properties and/or photochromic properties to a spectacle lens, as well as to provide a functional film having a uniform film thickness, or in cases where a polarizing film or another constituent element of an optical lens is layered on a spin-coated layer to be integrated therewith, the spin-coated layer containing the specific functional component may be laminated with the film or the element via an adhesive agent, or alternatively, a liquid resin material may be layered on the spin-coated layer and cured, so that a resin layer is laminated thereon.

However, the adhesive agent or the resin material to be layered on the spin-coated layer in the form of a thin layer contains a resin monomer, and the functional pigment described above is prone to migrate into the resin monomer. This leads to a problem that the expected functionality may be unstable, or that the uniformity of the function may be impaired, more likely causing unevenness in the expected function on the surface of the lens.

In extreme cases, there is a possibility that a coating film-forming component in the spin-coated layer in contact with the adhesive agent or the uncured liquid resin may be dissolved due to the monomer component and the like. In such a case, the outflow of the functional pigment may occur to result in a decrease in the expected function.

Further, CR-39 (allyl diglycol carbonate), for example, among uncured liquid resins, contains an organic peroxide, such as diisopropyl peroxydicarbonate, which may cause the deterioration of the function of the functional pigment when it comes in contact therewith.

Accordingly, an object of the present invention is to provide a spin coating material for use in a functional laminated spectacle lens, a functional laminated spectacle lens produced therewith, and a method of producing the same, which are capable of solving the above mentioned problems; wherein the functional laminated spectacle lens is obtained by laminating and integrating a plurality of constituent layers of an optical lens via a layer(s) containing a resin monomer, such as an adhesive agent layer. The above described production method using the above spin coating material allows for producing the functional laminated spectacle lens in which the migration (outflow) of a functional pigment from a functional layer into an adjacent layer containing the resin monomer is prevented; the functional pigment is less susceptible to the effect of an organic peroxide contained in the resin; the dissolution of the functional layer is prevented; and a uniform optical function is provided, due to uniform thickness characteristic of a film formed by spin coating; while achieving a high utilization efficiency of the pigment incorporated in the coating material.

Means for Solving the Problems

To solve the above mentioned problems, the present invention adopts the following constitution:

A spin coating material for use in a functional laminated spectacle lens which can be formed into a functional layer of a functional laminated spectacle lens by spin coating such that the functional layer imparts, to the functional laminated spectacle lens, an optical function required for the functional laminated spectacle lens, wherein the spin coating material is obtained by incorporating a functional pigment into an acrylic urethane resin which comprises, as a main component, an acrylic polyol containing 4-hydroxybutyl acrylate, and, as a curable component, a polyisocyanate.

In the spin coating material according to the present invention, having the above described constitution, the functional pigment is maintained in the acrylic urethane resin, and 4-hydroxybutyl groups derived from 4-hydroxybutyl acrylate in the acrylic urethane resin are present at a side chain portion independent from an acrylic main chain, with a high degree of freedom. In other words, when the acrylic urethane resin is cured in a state where 4-hydroxybutyl groups are sufficiently mixed with the functional pigment, highly reactive monovalent hydroxyl groups quickly react with the polyisocyanate as the curable component, and a large amount of crosslinking points are formed. Accordingly, in the functional layer obtained by curing the spin coating material, the required functional pigment is reliably maintained in the functional layer by a three-dimensional network structure; the migration of the functional pigment to an adjacent resin monomer-containing layer is prevented; and the functional pigment is made less susceptible to the effect of an organic peroxide contained in the resin.

The spin coating as used in the present invention refers to a known coating method in which coating is carried out by: placing and fixing a layer made of a constituent material of a laminated lens on a rotating apparatus; supplying an appropriate amount of a coating material by dropping or the like onto the layer at the center of the rotation; and rotating the apparatus at a required high speed to spread a coating film by a centrifugal force, thereby obtaining an uniform thin film.

By incorporating a silane coupling agent into the spin coating material according to the present invention, even in cases where an inorganic material, such as glass, is used as a constituent layer of the functional laminated spectacle lens, the spin coating material will have a high affinity with the inorganic material.

The functional laminated spectacle lens according to the present invention has the following constitution:

A functional laminated spectacle lens including at least one functional layer, characterized in that the functional layer is made of a material obtained by incorporating a functional pigment into an acrylic urethane resin which comprises, as a main component, an acrylic polyol containing 4-hydroxybutyl acrylate, and, as a curable component, a polyisocyanate. In the functional laminated spectacle lens, the functional layer is characterized by being made of a material obtained by incorporating a functional pigment into an acrylic urethane resin which comprises, as a main component, an acrylic polyol containing 4-hydroxybutyl acrylate, and, as a curable component, a polyisocyanate.

Accordingly, when the functional layer obtained by curing the spin-coated coating material is in contact with a liquid resin containing a resin monomer, such as an adhesive agent, the functional pigment in the functional layer is less likely to exude from the functional layer, and therefore, less likely to migrate into another resin layer in contact with the functional layer.

Thus, the spin coating material to be used in the method of producing a functional laminated spectacle lens is used for producing a functional laminated spectacle lens in which the migration (outflow) of the functional pigment from the functional layer is prevented, and which is excellent in the uniformity of the optical function due to the functional layer having a uniform thickness. Further, the spin coating material can also be used in the method of producing a functional laminated spectacle lens in which a high utilization efficiency of the incorporated pigment is achieved.

In order to fully obtain the above described effects, one of a tetraazaporphyrin compound, a photochromic compound, and an infrared-absorbing pigment, for example, can be used as the functional pigment.

Further, the functional laminated spectacle lens may include a polarizing film as one of the constituent layers of the functional laminated spectacle lens.

In the method of producing a functional laminated spectacle lens as described above, a spin coating method can be used as the method of forming a functional layer. Specifically, in the method of producing a functional laminated spectacle lens: a coating material obtained by incorporating a functional pigment into an acrylic urethane resin which comprises, as a main component, an acrylic polyol containing 4-hydroxybutyl acrylate, and, as a curable component, a polyisocyanate, is coated by a spin coating method on the surface of at least one of the constituent layers of the functional laminated spectacle lens to form a coating film; the coating film is cured to form a functional layer; and another constituent layer is laminated via an adhesive agent, or directly, on the functional layer, such that all the layers are integrally joined together.

The above described functional layer is formed on the surface of at least one of the constituent layers of the functional laminated spectacle lens, by coating thereon a coating material obtained by incorporating a functional pigment into an acrylic urethane resin which comprises, as a main component, an acrylic polyol containing 4-hydroxybutyl acrylate, and, as a curable component, a polyisocyanate.

Effect of the Invention

Since the spin coating material according to the present invention is obtained by incorporating a functional pigment into an acrylic urethane resin which comprises, as a main component, an acrylic polyol containing 4-hydroxybutyl acrylate, and, as a curable component, a polyisocyanate, the curing reaction of the acrylic polyol and the polyisocyanate occurs swiftly, and a large amount of crosslinking points are formed at the same time. This provides the advantages of: allowing the required functional pigment to be reliably maintained in the thus formed cured resin layer, which is a functional layer, by a three-dimensional network structure; preventing the migration of the functional pigment to an adjacent resin monomer-containing layer; and making the functional pigment less susceptible to the effect of an organic peroxide contained in the resin.

Further, in the present invention, since the functional layer made of a material obtained by incorporating a functional pigment into the specific acrylic urethane resin is formed on at least one of the constituent layers of the functional laminated spectacle lens, there are advantages that, in the resulting functional laminated spectacle lens, the dissolution, or the migration (outflow), of the functional pigment component from the functional layer into an adhesive agent or another constituent layer can be prevented, and an excellent uniformity and stability of the optical function in the surface of the lens can be achieved.

Still further, the method of producing a functional spectacle lens according to the present invention has an advantage that it is capable of producing a functional laminated spectacle lens having the above described advantages, while achieving a high utilization efficiency of the pigment incorporated in the coating material. In particular, there is also an advantage that the resulting functional laminated spectacle lens has a uniform optical function, due to uniform thickness characteristic of a film formed by spin coating.

MODE FOR CARRYING OUT THE INVENTION

The embodiments of the present invention will be described below with reference to the appended drawings.

Figure 1:
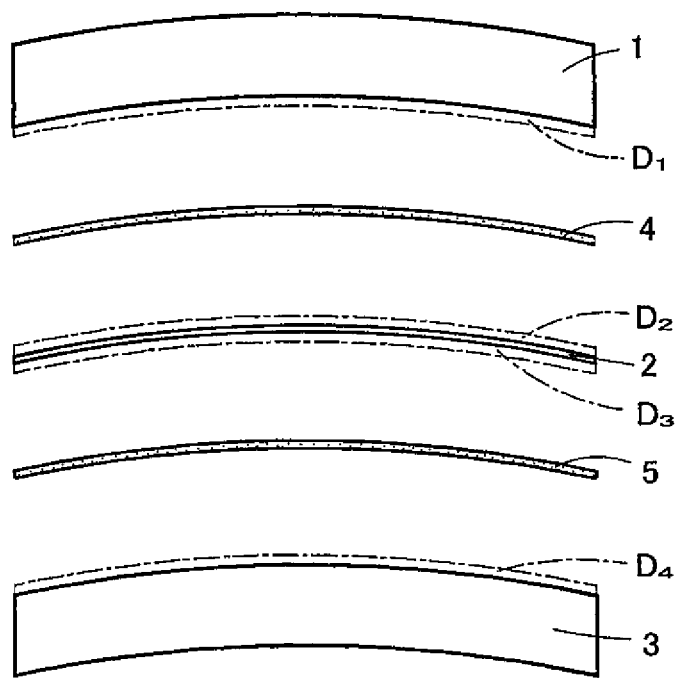
FIG. 1 is an exploded sectional view showing constituent layers of a functional laminated spectacle lens according to a first embodiment.

As shown in FIG. 1, a functional laminated spectacle lens according to a first embodiment includes, as constituent layers, an outer lens 1, a polarizing film 2, and an inner lens 3, which are layer parts. This functional laminated spectacle lens is obtained as follows. Firstly, any one of functional layers $D_1$, $D_2$, $D_3$, and $D_4$, or two or more layers thereof, are selectively formed on at least one of the constituent layers, using a spin coating material. Subsequently, adhesive layers 4 and 5 are further provided on the thus selectively formed functional layers $D_1$, $D_2$, $D_3$ and/or $D_4$, such that other constituent layers can be integrally joined therewith; or alternatively, an insert molding or the like is performed, using a liquid resin as a molding material of the outer lens 1, the inner lens 3 and the like, without providing any of the adhesive layers, such that all the layers are integrally joined together.

The functional layers $D_1$, $D_2$, $D_3$ and $D_4$ are each made of a material including a specific functional pigment to be described later, and one layer or two or more layers of the functional layers (the functional laminated spectacle lens shown in FIG. 1 may include up to 4 layers) may be laminated in the arrangement shown in FIG. 1.

For example, each of the functional layers $D_1$, $D_2$, $D_3$ and $D_4$ is obtained by: preparing a coating material by incorporating a required functional pigment into an acrylic urethane resin which comprises, as a main component, an acrylic polyol containing 4-hydroxybutyl acrylate, and, as a curable component, a polyisocyanate; and spin coating the resulting coating material; followed by curing.

The outer lens 1 and the inner lens 3, which are the constituent layers of the functional laminated spectacle lens, may be made of a glass or a resin material, and these lenses are usually made of a material which can be used as a material for a spectacle lens.

For example, a known soda-lime glass or crown glass can be used as the glass material. In order to prepare non-prescription spectacles, such as sunglasses, one having a thickness of about 1 mm may be used. Further, in order to prepare prescription spectacles, a spectacle lens material having an adequate thickness of from about 1 to 2 cm may be used, for one side.

Examples of spectacle lens materials made of resin include MMA (methyl methacrylate resins), PC (polycarbonate resins), CR-39 (allyl diglycol carbonate), thiourethane resins, and polyurethanes.

The coating material for spin coating of the functional layer(s) used in the present invention includes, as a coating film-forming component, an acrylic urethane resin which comprises, as a main component, an acrylic polyol containing 4-hydroxybutyl acrylate, and, as a curable component, a polyisocyanate.

The acrylic polyol containing 4-hydroxybutyl acrylate has a molecular structure in which a 4-hydroxybutyl group is grafted to a side chain of an acrylic main chain. In the acrylic polyol, all the hydroxyl groups bound to a terminal of a butylene chain are primary hydroxyl groups, and there is little steric hindrance, and thus, the hydroxyl groups have a high degree of freedom and a high reactivity with isocyanate groups in the polyisocyanate.

Accordingly, the reaction between a large amount of hydroxyl groups and isocyanate groups is allowed to proceed rapidly and sufficiently within a short period of time after the coating, and curing occurs rapidly to form a film which is insoluble in a solvent or the like.

In order to obtain a film having an expected solvent resistance due to sufficient crosslinking density, it is preferred that 4-hydroxybutyl acrylate be contained in the acrylic polyol in an amount of from 30 to 45% by mass. When 4-hydroxybutyl acrylate is contained in an amount less than the above range, a sufficient solvent resistance is less likely to be obtained. While on the other hand, when 4-hydroxybutyl acrylate is contained in a large amount exceeding the above range, the viscosity of the coating material becomes too high, thereby complicating the formation of a thin film. Thus, the amount outside the above range is not preferred.

A commercially available product can be used as such a two-liquid type acrylic urethane resin having the above described required characteristics. For example, ECOROCK HYPER CLEAR (registered trademark), which is an acrylic polyol containing 4-hydroxybutyl acrylate, manufactured by Rock Paint Co., Ltd., or the like, can be used as a main component of a quick-curable acrylic urethane resin which is capable of shortening the coating time for applying a top coat for automotive refinishing, or the like. As a curing agent, a commercially available polyisocyanate can be used.

In order to sufficiently increase the reactivity of the acrylic polyol with the isocyanate within a short period of time after the spin coating, it is preferred that the spin coating material according to the present invention preferably contains an acrylic polyol which is obtained by polymerizing 90% by mass or more of an essential specific mixture consisting of from 55 to 70% by mass of a polymerizable monomer having 4 or more carbon atoms, and from 30 to 45% by mass of 4-hydroxybutyl acrylate, and whose polymerization product has a glass transition point of 20° C. or higher.

Examples of solvents to be used for adjusting the viscosity of the spin coating material include methyl ethyl ketone (MEK), hexane, heptane, acetone, benzene, toluene, dichloromethane, and chloroform.

The functional pigment to be used in the present invention may be, for example, one of a tetraazaporphyrin compound and a photochromic compound.

The tetraazaporphyrin compound is known as a pigment for a toner or an ink, and a commercially available product such as PD-311S manufactured by Mitsui Chemicals, Inc., TAP-2 or TAP-9 manufactured by Yamada Kagaku Co., Ltd., or the like, can be used as the tetraazaporphyrin compound.

As the photochromic compound, a spirooxazine compound, a tetra(or hexa)benzoperopyrene compound, or the like can be used.

For example, PSP-33 manufactured by Yamada Kagaku Co., Ltd. can be used as a commercially available product of the spirooxazine photochromic compound.

Further, as the functional pigment to be used in the present invention, a neodymium pigment compound, a UV-absorbing pigment or an infrared-absorbing pigment, or a combination of both pigments can be used, in addition to the above described tetraazaporphyrin compound and photochromic compound.

Examples of the neodymium pigment compound include anhydrides and hydrates of known compounds as described above, such as neodymium acetate, neodymium chloride, neodymium nitrate, neodymium oxide, neodymium-2,4-pentanedionate, neodymium trifluoropentanedionate, fluorinated neodymium, and neodymium sulfate.

Examples of the UV-absorbing pigment include the following compounds:
  (1) 2-hydroxy-4-n-octoxybenzophenone,
  (2) 4-dodecyloxy-2-hydroxybenzophenone, and
  (3) 2-2'-hydroxy-4-methoxybenzophenone.

In the case of using these UV absorbers, it is preferred to select one capable of absorbing all types of UV light including UV-A (315 to 400 nm) having a long wavelength, UV-B (280 to 315 nm) having a short wavelength, and UV-C (100~280 nm) having a wavelength shorter than that of UV-B be absorbed.

As the infrared absorber, one capable of absorbing infrared light having a wavelength ranging from 780 to 2500 nm may be selected, and any known infrared-absorbing pigment can be used. Preferred examples include the following compounds:
  (1) infrared absorbers including N,N,N',N'-tetrakis(p-substituted phenyl)-p-phenylenediamines, benzidines, and aluminum salts and diimmonium salts thereof;
  (2) N,N,N',N'-tetraarylquinone diimmonium salts; and
  (3) bis-(p-dialkylaminophenyl)[N,N-bis(p-dialkylaminophenyl)p-aminophenyl]aluminum salts.

In the case of incorporating a silane coupling agent into the spin coating material, a commercially available product such as 3-aminopropyltrimethoxysilane (manufactured by Shin-Etsu Chemical Co., Ltd.) or 3-aminopropyltriethoxysilane (manufactured by Asahi Kasei Corporation), for example, can be used.

Further, the spin coating material may include a known additive for plastics, as long as the additive is included in an amount which does not impair the effect of the present invention.

Examples of the additive include antioxidants and photostabilizers. Specific examples of the antioxidant include phenolic antioxidants (ADEKASTAB AO series) manufactured by ADEKA Corporation. Examples of the photo stabilizer also manufactured by ADEKA Corporation include UV absorbers, and hindered amine light stabilizers which capture radicals generated by photooxidation, and specific examples of the UV absorber and the hindered amine light stabilizer include ADEKASTAB LA series.

The preparation of the functional laminated spectacle lens, by coating a coating material including the above described functional pigment by a spin coating method, and laminating constituent spectacle lenses, can be carried out as follows.

First, the above descried specific acrylic urethane resin, a polyisocyanate, an organic solvent, a functional pigment (such as a tetraazaporphyrin compound), and any of other additives (such as a silane coupling agent) are mixed to prepare a spin coating material composition which has a low viscosity and is in a state of a liquid. At the same time, a spectacle lens is fixed on a turn table of a spin coating apparatus (also referred to as a spin coater or a spinner), such that the center of either the inner or the outer side of the lens coincides with the center of the rotation.

Then, while dropping the above described coating material composition onto the center of the lens, the spin coating apparatus is rotated immediately after the dropping at a speed of from 50 to 5,000 rotations/minutes over a period of time from 30 to 60 seconds, such that a functional layer having an appropriate film thickness is formed. Subsequently, the resultant is heated to a temperature of from about 60 to 120° C., and left to stand for 3 to 10 hours, so as to allow sufficient crosslinking of the acrylic urethane resin, which is a film-forming component, and curing of the film.

An adhesive agent to be applied on top of the thus obtained functional layer is not limited to particular types, and a solvent-based or non-solvent-based adhesive agent containing a monomer for adjusting the viscosity or the like can be used.

For example, it is possible to use an adhesive agent which comprises as a main component an uncured monomer or oligomer of a high molecular weight compound, and a curing agent (along with a polymerization initiator, light absorber, or any of other additives), and which is cured by a photopolymerization reaction or the like, by the irradiation of UV light or any of other rays. Specific examples of the adhesive agent include UV curable acrylic resin adhesive agents, urethane resin adhesive agents, and modified silicone resin adhesive agents.

A polarizing film which is laminated as required on the thus formed functional layer to be integrated therewith may be one obtained by impregnating a polyvinyl alcohol (PVA) film with iodine or an iodine compound, or with a dichroic dye, and by subjecting the resultant to a uniaxial stretching. It is also possible to use, for example, a polarizing film obtained by mixing a dichroic dye or the like into a polyethylene terephthalate, followed by uniaxial stretching, or the like. Further, a composite film obtained by laminating a polarizing film with a triacetyl cellulose film or a polycarbonate film, or the like, can also be used.

Figure 2:
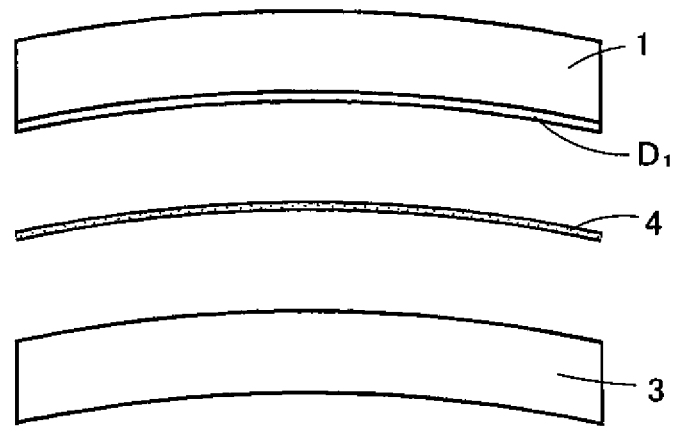
FIG. 2 is an exploded sectional view showing constituent layers of a functional laminated spectacle lens according to a second embodiment.

The functional laminated spectacle lens according to a second embodiment shown in FIG. 2 is an example specifically embodying the first embodiment in a more limited way. In this functional laminated spectacle lens, the outer lens 1 and the inner lens 3 are made of glass, and the functional layer $D_1$ is made of a spin coating material obtained by incorporating tetraazaporphyrin, which absorbs light having a wavelength within the range of from 560 to 610 nm, to the above described acrylic urethane resin, in order to obtain high contrast properties.

The functional layer $D_1$ is spin coated on the concave side of the outer lens 1, and it can be integrated with the outer lens 1 by being cured. The adhesive agent 4 is then applied in a layer on the surface of the cured functional layer $D_1$, and the inner lens 3 is then layered on top of the adhesive agent 4, to be integrated therewith.

Figure 3:
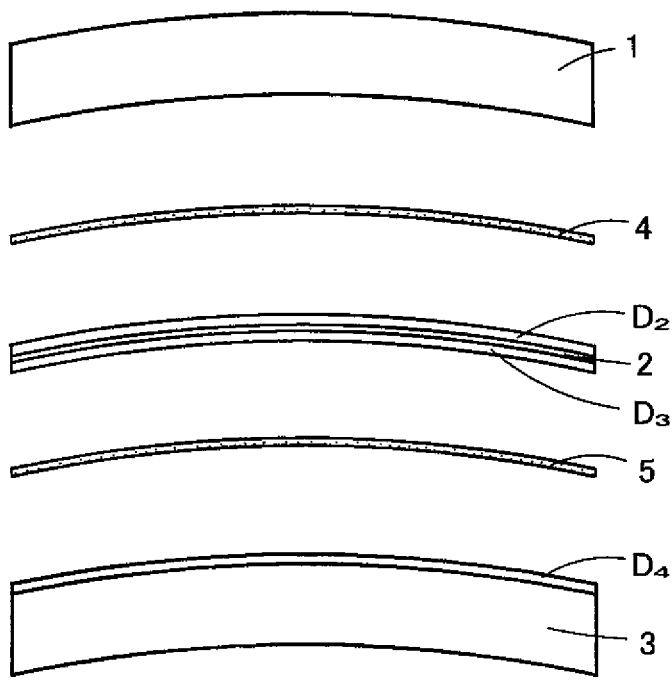
FIG. 3 is an exploded sectional view showing constituent layers of a functional laminated spectacle lens according to a third embodiment.

Further, the functional laminated spectacle lens according to a third embodiment shown in FIG. 3 is also an example specifically embodying the first embodiment in a more limited way. In this functional laminated spectacle lens, the functional layer $D_2$ (which contains a photochromic compound as the functional pigment) and the functional layer $D_3$ (which contains tetraazaporphyrin as the functional pigment) are each formed by spin coating, on both surfaces of the polarizing film 2 which has been pressure-molded to fit to the curve of the lens intended to be integrated into the laminated lens. At the same time, the functional layer $D_4$ (which contains an infrared absorber) is formed by spin coating on the convex side of the inner lens 3 made of glass. These parts are laminated and integrated in the arrangement shown in FIG. 3, with the adhesive layers 4 and 5 being interposed therebetween.

Figure 4:
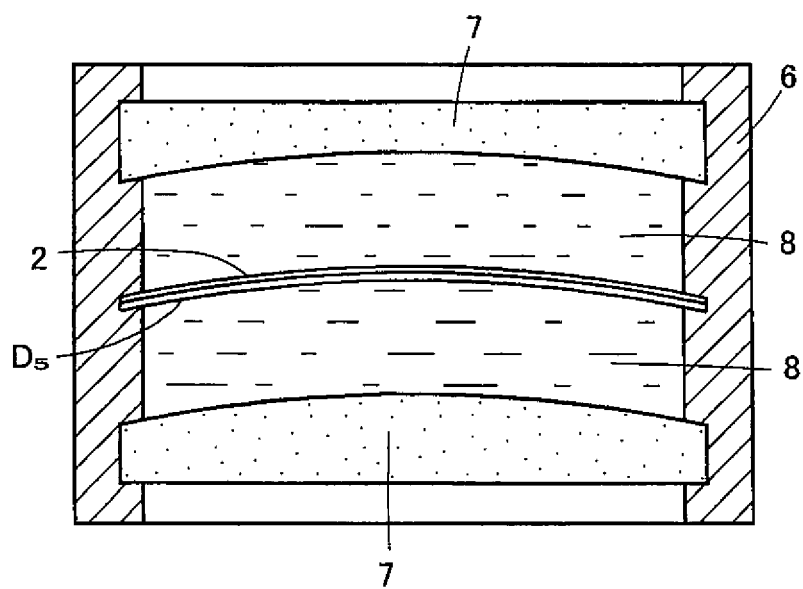
FIG. 4 is an explanatory diagram illustrating an insert molding performed in the production of a functional laminated spectacle lens according to a fourth embodiment.

Still further, the functional laminated spectacle lens according to a fourth embodiment shown in FIG. 4 is an example of the functional laminated spectacle lens which is obtained by a production process utilizing a so-called insert molding.

Specifically, the functional laminated spectacle lens can be obtained as follows. A functional layer $D_5$ made of a coating material obtained by incorporating tetraazaporphyrin into the above described acrylic urethane resin is formed by spin coating on the concave side of the polarizing film 2 which has been pressure-molded to fit to the curve of the lens, as described above. Then, the resultant as a polarizing element is fitted to the circumferential groove of the inner surface of a gasket 6, which is made of an elastic silicone resin and is in the shape of a cylinder, and molds 7 each in the shape of a disk are fitted and fixed in a liquid tight manner at both ends of the gasket 6 in the axis direction. Subsequently, a resin liquid (molding material) 8 such as CR-39 (allyl diglycol carbonate) is injected via a gate, which is not shown, into two cavities to be formed adjacent to both surfaces of the polarizing element, and the resultant is subjected to a heat curing by an ordinary method, thereby obtaining the functional laminated spectacle lens.

Example 1

A coating material including a tetraazaporphyrin compound as a functional pigment was prepared according to the following formulation, and coated on the surface of an inner-side glass lens by a spin coating method.

| | |
|---|---|
| (1) Acrylic polyol containing 4-hydroxybutyl acrylate (HYPER CLEAR; manufacture by Rock Paint Co., Ltd.) | 100.0 parts by mass |
| (2) Polyisocyanate | 33.3 parts by mass |
| (3) Cyclohexanone | 16.7 parts by mass |
| (4) Tetraazaporphyrin compound (TAP-2; manufactured by Yamada Kagaku Co., Ltd.) | 0.8 parts by mass |
| (5) Silane coupling agent (Sila Ace; manufactured by Chisso Corporation) | 0.7 parts by mass |

The inner lens (glass substrate) of a spectacle lens was fixed on a turn table of a spin coating apparatus such that the center of the lens coincides with the center of the rotation, and the coating material composition obtained as described above was dropped onto the center of the convex side of the lens in an amount of 1 to 2 mL. The spin coating apparatus was rotated immediately after the dropping at a speed of 3,000 rotations/minutes over a period of time of about 45 seconds, thereby forming a functional layer. Then the cross-linking reaction was allowed to continue at about 100° C. for 5 hours, so as to allow curing of the film.

Then a UV curable acrylic adhesive agent (LOCKTIGHT 3201; manufactured by Henkel Japan Ltd.) was coated on top of the resultant, and a polarizing film made of polyvinyl alcohol (PVA) was layered thereon. After further applying the above described adhesive agent on the resultant, the outer lens (glass substrate) of the spectacle lens was laminated thereon. While pressure-bonding the resultant, UV light was irradiated to cure the adhesive agent, thereby obtaining a laminated glass lens for polarized spectacles.

In the thus obtained functional laminated spectacle lens, the migration of the functional pigment (tetraazaporphyrin compound) from the functional layer in contact with the adhesive agent into the adhesive agent was prevented, and excellent properties of the tetraazaporphyrin compound to absorb light having a wavelength of 580 nm was well exhibited. At the same time, the functional laminated spectacle lens had a uniform optical function without unevenness, due to uniform thickness characteristic of a film formed by spin coating, and achieved a high utilization efficiency of the incorporated pigment.

Example 2

The same operation as in Example 1 was repeated except that a spirooxazine photochromic compound (PSP-33; manufactured by Yamada Kagaku Co., Ltd.) was used as the functional pigment instead of the tetraazaporphyrin compound, to produce a functional laminated spectacle lens.

In the thus obtained functional laminated spectacle lens, the migration of the photochromic compound from the functional layer in contact with the adhesive agent into the adhesive agent was prevented. At the same time, the laminated lens exhibited stable photochromic properties without unevenness.

Comparative Example 1

The same operation as in Example 1 was repeated except that a spin coating material prepared according to the following formulation was used, to produce a functional laminated spectacle lens.

| | |
|---|---|
| (1) Main agent for silicon acrylic resin (NEO SILICA 5000 GS, clear, liquid A; manufactured by Isamu Paint Co., Ltd.) | 100 parts by mass |
| (2) Curing agent for silicon acrylic resin (NEO SILICA 5000 GS, clear, liquid B; manufactured by Isamu Paint Co., Ltd.)) | 12.5 parts by mass |
| (3) Spirooxazine photochromic compound (PSP-33; manufactured by Yamada Kagaku Co., Ltd.) | 1.1 parts by mass |
| (4) Silane coupling agent (Sila Ace; manufactured by Chisso Corporation) | 0.4 parts by mass |
| (5) Toluene | 21.0 parts by mass |
| (6) Cyclohexanone | 31.3 parts by mass |

Since the resulting functional laminated spectacle lens was produced using the coating material which does not contain the specific acrylic urethane resin, the photochromic compound migrated from the functional layer in contact with the adhesive agent into the adhesive agent, and it was unable to obtain a sufficient photochromic effect as expected.

Comparative Example 2

The same operation as in Example 1 was repeated except that a spin coating material prepared according to the following formulation was used, to produce a functional laminated spectacle lens.

| | |
|---|---|
| (1) Epoxy coating agent (PHOTOBOND 200, aerobic and UV light curable; manufactured by Sunrise MSI Inc.) | 100.0 parts by mass |
| (2) Spirooxazine photochromic compound (PSP-33; manufactured by Yamada Kagaku Co., Ltd.) | 0.7 parts by mass |
| (3) Toluene | 33.0 parts by mass |
| (4) Acetone | 100.0 parts by mass |

Since the resulting functional laminated spectacle lens was produced using the coating material which does not contain the specific acrylic urethane resin, the photochromic compound migrated from the functional layer in contact with the adhesive agent into the adhesive agent, and it was unable to obtain a sufficient photochromic effect as expected.

Comparative Example 3

The same operation as in Example 1 was repeated except that a spin coating material prepared according to the following formulation was used, to produce a functional laminated spectacle lens.

| | |
|---|---|
| (1) Polyol for acrylic urethane resin (079 Line ROCK ACE No. 100; manufactured by Rock Paint Co., Ltd.) | 100.0 parts by mass |
| (2) Curing agent for acrylic urethane resin (079-110 isocyanate; manufactured by Rock Paint Co., Ltd.) | 10.0 parts by mass |
| (3) Spirooxazine photochromic compound (PSP-33; manufactured by Yamada Kagaku Co., Ltd.) | 0.6 parts by mass |
| (4) Silane coupling agent (Sila Ace; manufactured by Chisso Corporation) | 0.8 parts by mass |
| (5) Toluene | 26.6 parts by mass |

Since the resulting functional laminated spectacle lens was produced using the coating material which includes an acrylic urethane resin containing no 4-hydroxybutyl acrylate, the photochromic compound migrated from the functional layer in contact with the adhesive agent into the adhesive agent, and it was unable to obtain a sufficient photochromic effect as expected.

Comparative Example 4

The same operation as in Example 1 was repeated except that a spin coating material prepared according to the following formulation was used, to produce a functional laminated spectacle lens.

| | |
|---|---|
| (1) Nitrocellulose lacquer coating material (038 Line CO-ROCK; manufactured by Rock Paint Co., Ltd.) | 100.0 parts by mass |
| (2) Spirooxazine photochromic compound (PSP-33; manufactured by Yamada Kagaku Co., Ltd.) | 0.5 parts by mass |
| (3) Silane coupling agent (Sila Ace; manufactured by Chisso Corporation) | 0.5 parts by mass |
| (4) Toluene | 75.0 parts by mass |

Since the resulting functional laminated spectacle lens was produced using the coating material which does not contain the specific acrylic urethane resin, the photochromic compound migrated from the functional layer in contact with the adhesive agent into the adhesive agent, and it was unable to obtain a sufficient photochromic effect as expected.

Comparative Example 5

The same operation as in Example 1 was repeated except that a spin coating material prepared according to the following formulation was used, to produce a functional laminated spectacle lens.

| | |
|---|---|
| (1) Acrylic lacquer coating material (ATRON 3000 clear; manufactured by Isamu Paint Co., Ltd.) | 100.0 parts by mass |
| (2) Spirooxazine photochromic compound (PSP-33; manufactured by Yamada Kagaku Co., Ltd.) | 0.5 parts by mass |
| (3) Silane coupling agent (Sila Ace; manufactured by Chisso Corporation) | 0.4 parts by mass |
| (4) Toluene | 50.0 parts by mass |

Since the resulting functional laminated spectacle lens was produced using the coating material which does not contain the specific acrylic urethane resin, the photochromic compound migrated from the functional layer in contact with the adhesive agent into the adhesive agent, and it was unable to obtain a sufficient photochromic effect as expected.

Comparative Example 6

The same operation as in Example 1 was repeated except that a spin coating material prepared according to the following formulation was used, to produce a functional laminated spectacle lens.

| | |
|---|---|
| (1) Epoxy resin: main agent (EPONICS No. 10; manufactured by Dai Nippon Toryo Co., Ltd.) | 100 parts by mass |
| (2) Epoxy resin: curing agent (EPONICS No. 10; manufactured by Dai Nippon Toryo Co., Ltd.) | 25.0 parts by mass |
| (3) Spirooxazine photochromic compound (PSP-33; manufactured by Yamada Kagaku Co., Ltd.) | 1.0 parts by mass |
| (4) Silane coupling agent (Sila Ace; manufactured by Chisso Corporation) | 0.3 parts by mass |
| (5) Toluene | 50.0 parts by mass |

Since the resulting functional laminated spectacle lens was produced using the coating material which does not contain the specific acrylic urethane resin, the photochromic compound migrated from the functional layer in contact with the adhesive agent into the adhesive agent, and it was unable to obtain a sufficient photochromic effect as expected.

Example 3

A functional laminated spectacle lens was produced by insert molding, using a polarizing element prepared as described below instead of the polarizing element composed of the polarizing film 2 and the functional layer $D_5$ shown in FIG. 4, which is used in the functional laminated spectacle lens according to the fourth embodiment.

Figure 5:
FIG. 5 is a sectional view showing a polarizing element of a functional laminated spectacle lens produced in Example 3.

Specifically, as shown in FIG. 5, a coating material (composition $D_6$) obtained by incorporating a near infrared-absorbing pigment into the specific acrylic urethane resin containing 4-hydroxybutyl acrylate was coated by spin coating on the concave side of the polarizing film 2 which had been pressure-molded to fit to the curve of the lens, to form a functional layer $D_{6a}$. On the convex side of the polarizing film 2, a coating material (composition $D_7$) obtained by incorporating a spirooxazine photochromic compound into the specific acrylic urethane resin containing 4-hydroxybutyl acrylate was coated by spin coating, to form a functional layer $D_{7a}$.

The compositions of the coating material (composition $D_6$) and the coating material (composition $D_7$) are as follows.

[Coating Material (Composition $D_6$)]

| | |
|---|---|
| (1) Acrylic polyol containing 4-hydroxybutyl acrylate (HYPER CLEAR; manufactured by Rock Paint Co., Ltd.) | 100.0 parts by mass |
| (2) Polyisocyanate | 33.3 parts by mass |
| (3) Diimmonium near infrared-absorbing pigment (IRG068; manufactured by Nippon Kayaku Co., Ltd.) | 5.0 parts by mass |
| (4) Silane coupling agent (Sila Ace; manufactured by Chisso Corporation) | 0.7 parts by mass |
| (5) Cyclohexanone | 16.7 parts by mass |

[Coating Material (Composition $D_7$)]

| | |
|---|---|
| (1) Acrylic polyol containing 4-hydroxybutyl acrylate (HYPER CLEAR; manufactured by Rock Paint Co., Ltd.) | 100.0 parts by mass |
| (2) Polyisocyanate | 33.3 parts by mass |
| (3) Spirooxazine photochromic compound (PSP33; manufactured by Yamada Kagaku Co., Ltd.) | 5.0 parts by mass |
| (4) Silane coupling agent (Sila Ace; manufactured by Chisso Corporation) | 0.7 parts by mass |
| (5) Cyclohexanone | 16.7 parts by mass |

Each of the above described coating materials was coated on each side of the polarizing film sequentially, to form each of the functional layers. Specifically, the polarizing film was held in a lens-shaped holder on a turn table of a spin coating apparatus, such that the center of the polarizing film coincide with the center of the rotation. Then one of the coating materials was dropped on the center of one side of the polarizing film in an amount of from 1 to 2 mL. The spin coating apparatus was rotated immediately after the dropping at a speed of 3,000 rotations/minutes over about 45 seconds to form a functional layer. Then the crosslinking reaction was allowed to continue at about 100° C. for 5 hours, so as to allow curing of the film. Another functional layer was then formed in the same manner on the other side of the polarizing film using the other coating material, thereby producing a polarizing element.

In the same manner as the polarizing element shown in FIG. 4, the thus obtained polarizing element was fitted to the circumferential groove of the inner surface of the gasket 6, which is made of an elastic silicone resin and is in the shape of a cylinder, and the molds 7 each in the shape of a disk were fitted and fixed in a liquid tight manner at both ends of the gasket 6 in the axis direction. Subsequently, the resin liquid (molding material) 8 such as CR-39 (allyl diglycol carbonate) was injected via a gate, which is not shown, into two cavities to be formed adjacent to both surfaces of the polarizing element, and the resultant was subjected to a heat curing by an ordinary method, thereby obtaining a functional laminated spectacle lens.

In the resulting functional laminated spectacle lens, the functional pigments (near infrared-absorbing pigment and photochromic compound) which had been incorporated into the specific acrylic urethane resins did not migrate into the resin lenses formed by insert molding, and the infrared-absorbing properties and photochromic properties were sufficiently exhibited. At the same time, the functional laminated spectacle lens had a uniform optical function without unevenness, due to uniform thickness of the functional layers formed by spin coating, and achieved a high utilization efficiency of the incorporated pigments.

DESCRIPTION OF SYMBOLS 1 outer lens
2 polarizing film
3 inner lens
4, 5 adhesive layer
6 gasket
7 mold
8 resin liquid
$D_1$, $D_2$, $D_3$, $D_4$, $D_5$, $D_{6a}$, $D_{7a}$ functional layer

The invention claimed is:

1. A functional laminated spectacle lens comprising at least one functional layer which is provided adjacent to a layer containing a resin monomer,
    wherein the functional layer is formed by spin-coating a material obtained by incorporating a functional pigment into an acrylic urethane resin which comprises, as a main component, an acrylic polyol containing from 30 to 45% by mass of 4-hydroxybutyl acrylate, and, as a curable component, a polyisocyanate.

2. The functional laminated spectacle lens according to claim 1, wherein the functional pigment is one of a tetraazaporphyrin compound, a photochromic compound, and an infrared-absorbing pigment.

3. The functional laminated spectacle lens according to claim 1, further comprising a layer of a polarizing film.

4. A method of producing a functional laminated spectacle lens comprising at least a first layer, a second layer and a third layer, the method comprising:
    preparing a spin coating material which can be formed into a functional layer of the functional laminated spectacle lens by spin coating such that the functional layer imparts, to the functional laminated spectacle lens, an optical function required for the functional laminated spectacle lens, wherein the spin coating material is obtained by incorporating a functional pigment into an acrylic urethane resin which comprises, as a main component, an acrylic polyol containing from 30 to 45% by mass of 4-hydroxybutyl acrylate, and, as a curable component, a polyisocyanate;
    spin coating the spin coating material on a surface of the first layer;
    allowing the spin coating material to cure to form, as the second layer, the functional layer;
    applying one of an adhesive agent and a liquid resin on a surface of the functional layer; and
    allowing the one of the adhesive agent and the liquid resin to cure to form the third layer such that the first, second and third layers are integrally joined together.

5. The functional laminated spectacle lens according to claim 2, further comprising a layer of a polarizing film.

6. The method according to claim 4, wherein the spin coating material contains a silane coupling agent as an essential component.

* * * * *